United States Patent
Seol

(10) Patent No.: US 7,505,429 B2
(45) Date of Patent: Mar. 17, 2009

(54) METHOD FOR DETERMINING PACKET DATA RATE IN WIRELESS COMMUNICATION SYSTEM

(75) Inventor: Jee Woong Seol, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 976 days.

(21) Appl. No.: 10/833,300

(22) Filed: Apr. 28, 2004

(65) Prior Publication Data

US 2004/0228302 A1    Nov. 18, 2004

(30) Foreign Application Priority Data

Apr. 29, 2003    (KR) .................. 10-2003-0027091

(51) Int. Cl.
G01R 31/08 (2006.01)
(52) U.S. Cl. ..................................... 370/329
(58) Field of Classification Search ................ 370/229
See application file for complete search history.

(56) References Cited

U.S. PATENT DOCUMENTS 6,751,199 B1 * 6/2004 Sindhushayana et al. .... 370/252

2002/0127983 A1 * 9/2002 Black et al. ................. 455/135

* cited by examiner

Primary Examiner—Chirag G Shah
Assistant Examiner—Ramtin Kangarloo
(74) Attorney, Agent, or Firm—KED & Associates, LLP

(57) ABSTRACT

A method of determining a packet data rate in a mobile communication system is provided. The method includes steps of estimating a channel reception status value after a predetermined time corresponding to a predetermined window size, by assigning a different weight factor to at least one channel reception status of an earlier time and to a channel reception status of a present time; determining a remainder value for adjusting a channel reception sensitivity value according to a decoding status of received packet data, by incrementing the remainder value when the received data packet is successfully decoded and otherwise decrementing the remainder value, i.e., when decoding is unsuccessful; calculating a threshold value for determining a packet data rate by applying the remainder value to the estimated channel reception status value; and determining a highest packet data rate among a set of values falling below a rate corresponding to the calculated threshold value. The threshold value is applied to the channel reception status value estimated for each predetermined window size.

12 Claims, 5 Drawing Sheets

METHOD FOR DETERMINING PACKET DATA RATE IN WIRELESS COMMUNICATION SYSTEM

CROSS-REFERENCE TO RELATED APPLICATIONS

This application claims the benefit of Korean Application No. 10-2003-0027091 filed on Apr. 29, 2003, which is hereby incorporated by reference.

BACKGROUND OF THE INVENTION

1. Field of the Invention

The present invention relates to wireless communication, and more particularly, to a method for determining a packet data rate in a wireless communication according to a channel status and a data packet reception status.

2. Discussion of the Related Art

In the transmission of packet data in a mobile communication system, the data rate is determined through a calculation based on dynamic channel conditions, which may be expressed in terms of a packet error rate resulting from a recent instance of transmission. In doing so, channel conditions are repeatedly monitored and the packet data rate is continuously updated, to maintain an acceptable packet error rate for the fastest data transfer permissible. In other words, favorable channel conditions permit higher data rates while poor channel conditions necessitate lower data rates.

The packet data rate is determined based on channel status information, which corresponds to a calculated maximum rate permissible for subsequent data to be transmitted, and the packet data rate is set by a data scheduler accordingly. The packet data rate may be determined at a base station, whereby the channel status information is transmitted to the base station, which performs a calculation determining the maximum rate. The packet data rate may also be determined at a mobile terminal, whereby the calculation of the maximum rate is performed by the mobile station and a calculated maximum value is transmitted to the base station. In either case, the packet data rate is calculated based on received information and is relevant to conditions felt at the receiving side.

The optimal packet data rate is ultimately determined by referencing a set of packet data rates stored in a lookup table, where each data rate corresponds to a range of values of the channel status information, each of which is separated by a boundary value. Accordingly, once the channel status information is obtained—typically, as a signal-to-interference-plus-noise ratio—the optimal packet data rate can be determined. The selected rate, however, represents a conservative assessment. That is, the selected packet data rate corresponds to the range immediately below that corresponding to the obtained channel status information.

FIG. 1 illustrates a channel environment existing at the time of data transmission between a mobile terminal and base station. Here, the mobile terminal first transmits channel information or a requested packet data rate to the base station at a time A, and the base station thereafter transmits the packet data to the mobile station at a time B.

Meanwhile, the data scheduler requires a delay time $t_s$ for preparation of the data packet. Thus, in addition to varying propagation delays, there is a marked differential in the time (A) of sensing the channel status at the mobile and the time (B) of transmitting the data from the base terminal. Since the channel conditions are in a continual state of flux and since the mobile terminal is likely to be in a state of motion, there is a difference between the channel status at time B and the channel status at time A, and as indicated by the example plot of the channel information of FIG. 1, this difference may be great. Moreover, in the case of high-speed motion by a mobile terminal user, say, by vehicular means, an accurate prediction of channel status becomes more critical. Therefore, when determining a packet data rate based on quality of service, there is an increased likelihood of transmission failure.

If, based on inaccurate assumptions of the channel conditions, the selected packet data rate is too high, the packet error rate will exceed acceptable limits such that the quality of service suffers. On the other hand, selection of a packet data rate that is too low results in an inefficient uplink or downlink, and the quality of service still suffers. Therefore, a method of determining an optimal packet data rate for selection is needed to accurately reflect changes in the channel environment.

SUMMARY OF THE INVENTION

Accordingly, the present invention is directed to a method for determining a packet data rate in a wireless communication system, which substantially obviates one or more of the problems due to limitations and disadvantages of the related art.

An object of the present invention, which has been devised to solve the foregoing problem, lies in providing a method of determining a packet data rate in a mobile communication system, by which a packet data rate can be determined by accurately predicting a channel environment at a time of data packet transmission.

It is another object of the present invention to provide a method of determining a packet data rate in a mobile communication system, by which a target quality-of-service is maintained for a variety of channel environments.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of determining a packet data rate in a mobile communication system, comprising steps of estimating a channel reception status value after a predetermined time corresponding to a predetermined window size, by assigning a different weight factor to at least one channel reception status of an earlier time and to a channel reception status of a present time; determining a remainder value for adjusting a channel reception sensitivity value according to a decoding status of received packet data; calculating a threshold value for determining a packet data rate by applying the remainder value to the estimated channel reception status value; and determining a highest packet data rate among a set of values falling below a rate corresponding to the calculated threshold value, wherein the threshold value is applied to the channel reception status value estimated for each predetermined window size.

Preferably, an increment value is applied to the remainder value when the decoding status of the received data packet is represented by an ACK signal, and a decrement value is applied to the remainder value when the decoding status of the received data packet is represented by a NACK signal.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

According to the present invention, the data packet rate may be determined at the terminal or at the base station. Hereinafter, a method of determining the data packet rate at the terminal will be described as an example of the present invention, which is equally applicable to a method of determining the data packet rate at the base station.

Figure 1:
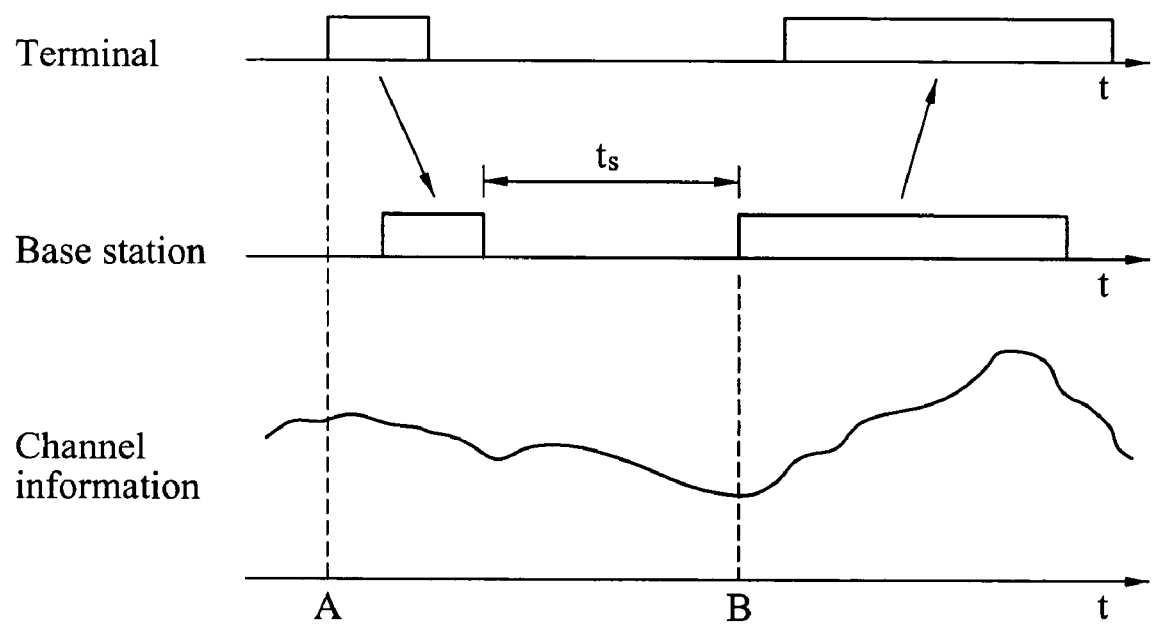
FIG. 1 is a diagram showing a channel environment of a data transmission and reception process.
Figure 2:
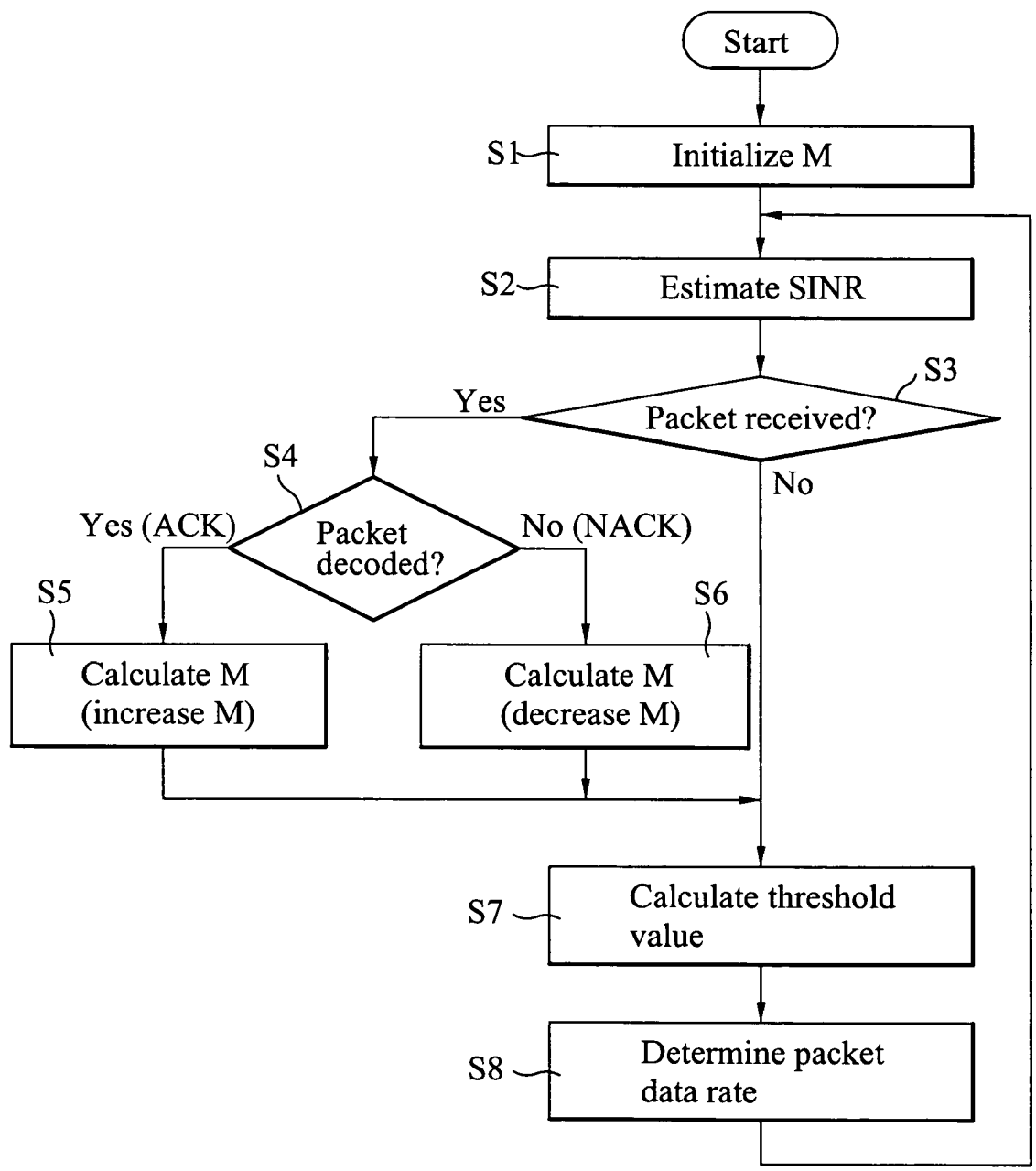
FIG. 2 is a flow chart showing a method of determining a packet data rate in accordance with the present invention.

FIG. 2 illustrates a method of determining a packet data rate in accordance with the present invention. When a call is initiated, a remainder value (M) is initialized at 0 dB in a step S1.

With the remainder value thus initialized, the channel reception status of a packet transmission channel is obtained, typically, as a signal-to-interference-plus-noise ratio (SINR) expressed in decibels. When transmitting on a packet transmission channel, the referenced channel information is information estimated earlier than a time to transmit the packet data. Therefore, the channel information is inaccurate. To render more accurate information, the present invention includes a process for simply tracking the channel status, taking into consideration potential changes to occur after estimation and before the channel information is to be used.

Accordingly, in a step S2, an estimated channel reception status value ($SINR_{est}$) is calculated by $$SINR_{est} = SINR_{est}\left(1 - \frac{1}{window_{est}}\right) + \frac{SINR_{cur}}{SINR_{est}}$$

where $SINR_{cur}$ is the current channel reception status value of a present channel and $window_{est}$ is a value (larger than one) calculated by applying a weight to the channel reception status values estimated for each predetermined window size. Window sizes are set by the communication system.

Referring to steps S3 and S4, if it is determined that a packet is received from the base station, the mobile terminal attempts to decode the received packet. An "ACK" signal is transmitted if decoding is successful, and a "NACK" signal is transmitted if decoding is unsuccessful. The transmission result is used to obtain a packet error rate, which in turn is used to estimate a value M for increasing or decreasing the channel reception value.

If an "ACK" signal is transmitted, the remainder value M is adjusted in a step S5 by adding an increment value $\Delta_{up}$ ($M=M+\Delta_{up}$), and then the remainder value M is determined as $min(M, theshold_{max})$. Here, $\Delta_{up}$ is less than a maximum predetermined value in the system.

If a "NACK" signal is transmitted, the remainder value M is adjusted in a step S6 by subtracting a decrement value $\Delta_{down}$ ($M=M-\Delta_{down}$), and then the remainder value M is determined as $max(M, theshold_{min})$. Here, $\Delta_{down}$ is greater than a minimum predetermined value in the system.

The step size of the remainder value M equals $\Delta_{up}$ or $\Delta_{down}$, and $\Delta_{up}$ is always a smaller value than $\Delta_{down}$. Here, $\Delta_{up}=\alpha\Delta_{down}$, where $\alpha$ is a ratio of the increased value and the decreased value, or $PER/(1-PER)$, PER being the target packet error rate and an indication of the quality of service.

Thereafter, a threshold value is calculated in a step S7 as the sum of the channel reception status value and the remainder value ($SINR_{est}+M$).

Then, the maximum packet data rate ($R_{max}$) is determined in a step S8 by $$R_{max} = \underset{R}{\operatorname{argmax}}\{SINR_{est} + M > SINR_{req}(R)\}$$

where $SINR_{req}(R)$ is the SINR value required for receiving the packet data at the determined packet data rate R.

A maximum packet data rate is determined as the data rate of the packet data to be transmitted by setting the calculated threshold value as a boundary value. The terminal transmits the packet data rate information to the base station, which then transmits the packet to the terminal accordingly.

Figure 3:
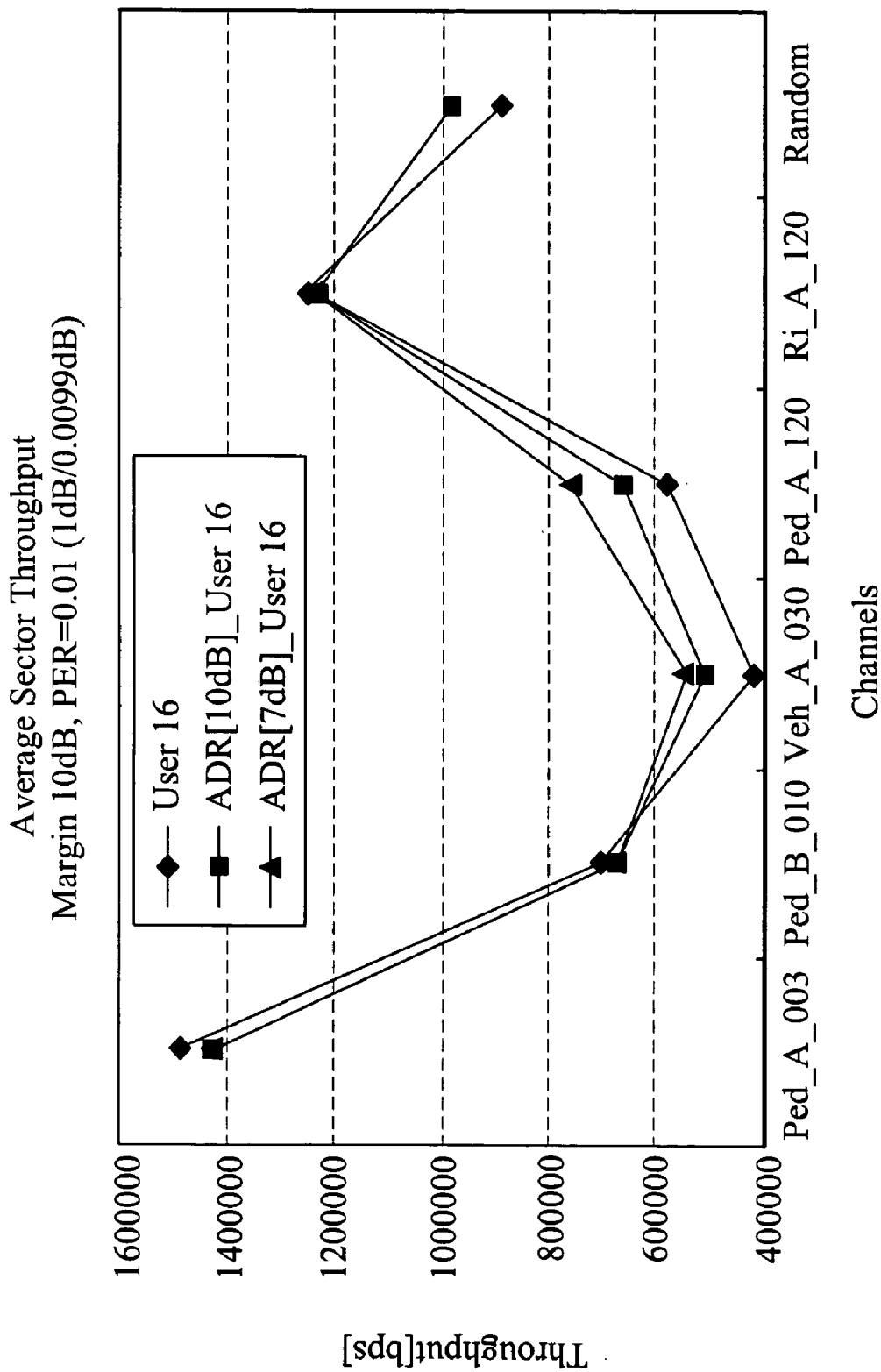
FIG. 3 is a graph showing a management amount of the communication system according to channel status in a 1xEV-DO communication system in accordance with the present invention.

FIG. 3 illustrates a management amount of the communication system according to the channel status in a 1xEV-DO communication system in accordance with the present invention. As shown, system efficiency experiences an increase of about 25% for the Veh_A_030 and Ped_A_120 channel models (based on ITU-R M.1225 channel models).

Figure 4:
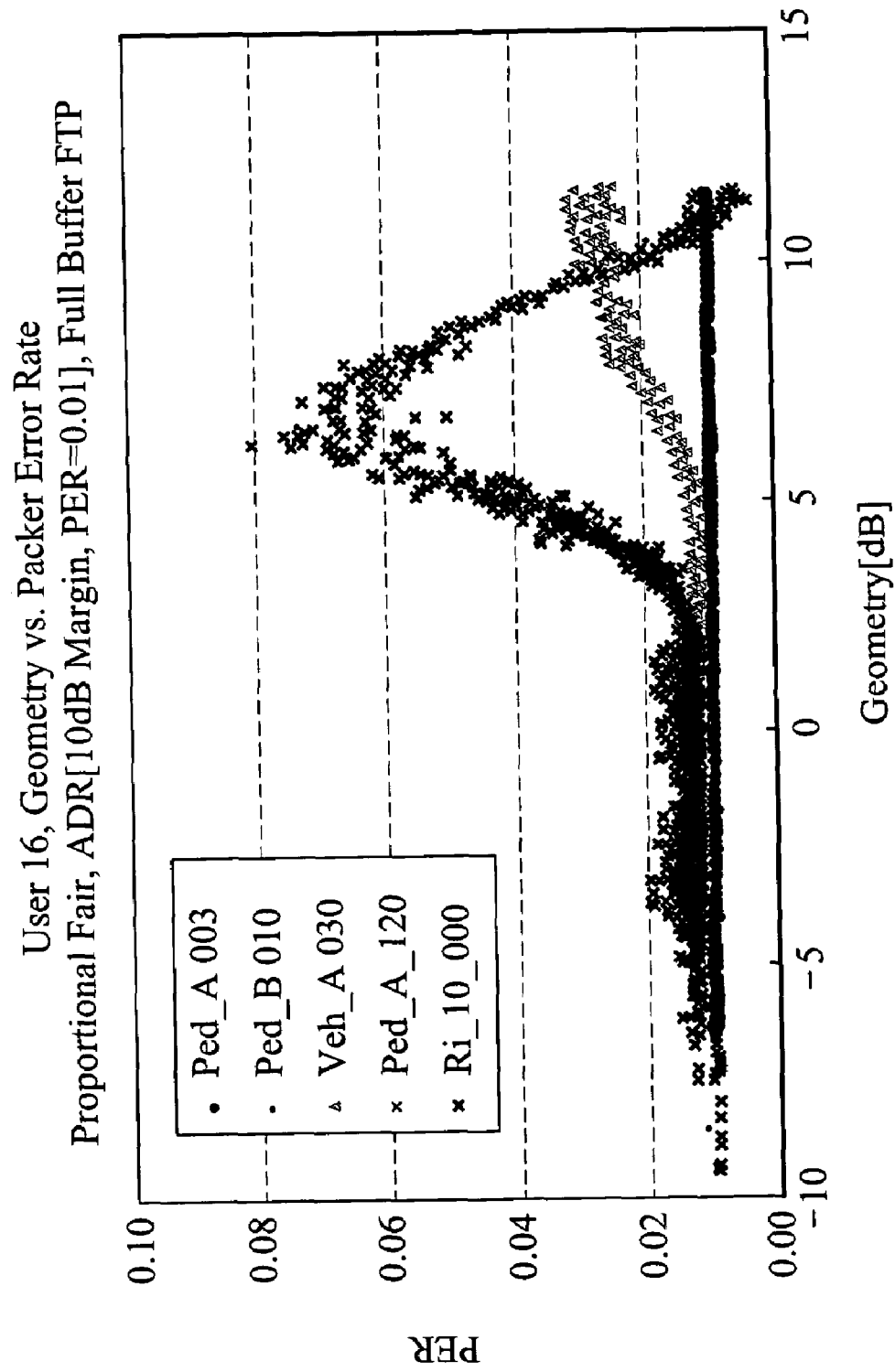
FIG. 4 is a graph showing a packet error rate according to channel reception when the packet is transmitted.
Figure 5:
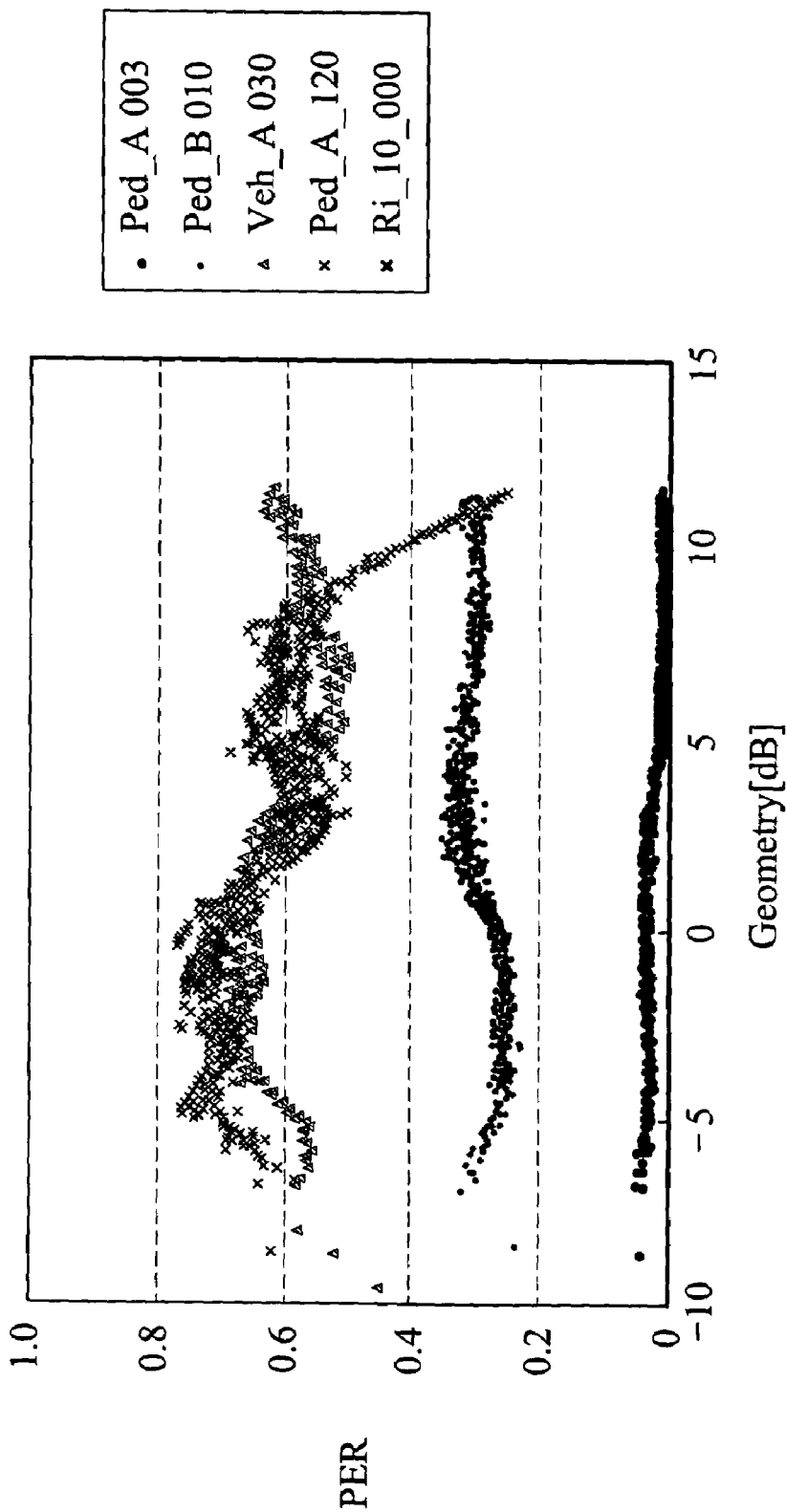
FIG. 5 is a graph showing a packet error rate according to channel reception when the packet is transmitted.

Referring to FIG. 4 and FIG. 5, illustrating packet error rates according to channel reception when the packet is transmitted, it should be noted that a packet data rate determined in consideration of the remainder value is significantly lower than that determined without regard to the remainder value, and the remainder value is fixed to 1%. The reduced error rate results in quality-of-service stability over time.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A method of determining a packet data rate in a mobile communication system, comprising:

estimating a channel reception status value after a predetermined time corresponding to a predetermined window size, by assigning a weight to at least one channel reception status of an earlier time and to a channel reception status of a present time;

determining a remainder value for adjusting a channel reception sensitivity value according to a decoding status of received packet data;

calculating a threshold value for determining a packet data rate by applying the remainder value to the estimated channel reception status value; and determining a highest packet data rate among a set of values falling below a rate corresponding to the calculated threshold value, wherein, when the decoding status of the received data packet is represented by an ACK signal, an increment value is applied to the remainder value, and when the decoding status of the received data packet is represented by a NACK signal, a decrement value is applied to the remainder value; and wherein the increment value and decrement value are defined by a predetermined ratio, and the predetermined ratio is PER/(1−PER), where PER is a target packet error rate.

2. The method as claimed in claim 1, wherein the threshold value is applied to the channel reception status value estimated for each predetermined window size.

3. The method as claimed in claim 1, wherein the increment value is less than a maximum value fixed by the mobile communication system.

4. The method as claimed in claim 1, wherein the decrement value is greater than a minimum value fixed by the mobile communication system.

5. A method of determining a packet data rate in a mobile communication system having a lookup table for mapping channel reception values to a plurality of packet data rates, the method comprising:

estimating a channel reception status value at a predetermined time of a predetermined channel;

determining a remainder value of the estimated channel reception status value according to whether a data packet is successfully decoded; and determining the packet data rate corresponding to the channel reception status value determined by applying the remainder value to a mapped channel reception value of the lookup table corresponding to the estimated channel reception status value, wherein, when the data packet is successfully decoded, an increment value is applied to the remainder value, and when the data packet is not successfully decoded, a decrement value is applied to the remainder value, and wherein the increment value and decrement value are defined by a predetermined ratio, and the predetermined ratio is PER/(1−PER), where PER is a target packet error rate.

6. The method as claimed in claim 5, wherein the channel reception status value is estimated by assigning a weight to at least one channel reception status of an earlier time and to a channel reception status of a present time.

7. A control method comprising:

computing a channel reception status value based on a predetermined window size;

performing a decoding operation for a received packet;

changing a remainder value based on a result of the decoding operation;

calculating a threshold value based on a sum of the channel reception status value and the changed remainder value; and computing a packet data rate for controlling transmission of data in a mobile communication system, the packet data rate computed based on the calculated threshold value, wherein changing the remainder value includes:

increasing the remainder value by a first fixed incremental value if the decoding operation was successful; and decreasing the remainder value by a second fixed incremental value if the decoding operation was unsuccessful, wherein the second fixed incremental value is greater than the first fixed incremental value.

8. The method of claim 7, further comprising:

detecting that the decoding operation for the received packet is unsuccessful based on transmission of a non-acknowledgment (NACK) signal; and detecting that the decoding operation for the received packet is successful based on transmission of an acknowledgment (ACK) signal.

9. The method of claim 7, wherein the first and second fixed incremental values are defined by a predetermined ratio that corresponds to PER/(1−PER) where PER is a target packet error rate.

10. The method of claim 7, wherein the second fixed incremental values is $\alpha$ times greater than the first fixed incremental value, where is a constant value.

11. The method of claim 7, wherein the packet data rate has a maximum value limited by the calculated threshold value.

12. The method of claim 7, wherein the channel reception status value is based on a signal-to-interference-plus-noise ratio.

* * * * *